United States Patent
Landau et al.

(10) Patent No.: US 6,804,660 B2
(45) Date of Patent: Oct. 12, 2004

(54) SYSTEM METHOD AND ARTICLE OF MANUFACTURE FOR INTERNET BASED AFFILIATE POOLING

(75) Inventors: Michael Landau, Sausalito, CA (US); Evan Horowitz, San Francisco, CA (US)

(73) Assignee: Essociate, Inc., San Francisco, CA (US)

( * ) Notice: Subject to any disclaimer, the term of this patent is extended or adjusted under 35 U.S.C. 154(b) by 757 days.

(21) Appl. No.: 09/846,159

(22) Filed: May 1, 2001

(65) Prior Publication Data

US 2001/0047413 A1 Nov. 29, 2001

Related U.S. Application Data

(60) Provisional application No. 60/201,041, filed on May 1, 2000.

(51) Int. Cl.[7] .............................................. G06F 17/60
(52) U.S. Cl. ....................................................... 705/14
(58) Field of Search ................................ 705/1, 10, 14

(56) References Cited

U.S. PATENT DOCUMENTS

| | | | |
|---|---|---|---|
| 5,712,979 A | | 1/1998 | Graber et al. |
| 5,724,424 A | | 3/1998 | Gifford |
| 5,793,972 A | | 8/1998 | Shane |
| 5,974,396 A | * | 10/1999 | Anderson et al. ............. 705/10 |
| 5,991,740 A | | 11/1999 | Messer |
| 5,999,929 A | | 12/1999 | Goodman |
| 6,029,141 A | | 2/2000 | Bezos et al. |

FOREIGN PATENT DOCUMENTS

| | | | |
|---|---|---|---|
| EP | 001160714 A1 | * 5/2001 | ........... G06F/17/60 |
| WO | WO 00/33272 | 6/2000 | |
| WO | WO 00/60484 | 10/2000 | |

OTHER PUBLICATIONS

Zineldin Mosdad; "Beyond Relationship Marketing: Technologicalship Marketing"; v18n1; ISSN:0263–4503; Sep. 23, 200 pp. 9–23.*

* cited by examiner

Primary Examiner—Stephen Gravini
(74) Attorney, Agent, or Firm—Perkins Coie LLP

(57) ABSTRACT

The present invention provides a method, system and computer program for affording Virtual Affiliates access to an existing affiliate system. First, having been assigned a unique identifier within a source affiliate system, a Webmaster operates a web site. Next, a request for a target Merchant Web site triggers a correlation function, such that the source Webmaster unique identifier is correlated to a target Webmaster unique identifier functional within the unique identification system of the requested Merchant system. Next, a properly formatted entry mechanism URL is returned, enabling a hand off to the target Merchant affiliate system and including the correlated target Webmaster unique identifier. The Virtual Affiliate system is notified of transactions that originated from a referring Webmaster. Referring Webmasters may be compensated for each completed transaction according to agreed-upon terms and conditions.

40 Claims, 10 Drawing Sheets

SYSTEM METHOD AND ARTICLE OF MANUFACTURE FOR INTERNET BASED AFFILIATE POOLING

CROSS REFERENCE TO RELATED APPLICATIONS

This application claims the benefit of U.S. provisional patent application 60/201,041 filed May 1, 2000, incorporated herein by reference the same as if filly set forth.

STATEMENT REGARDING FEDERALLY SPONSORED RESEARCH

Not applicable.

FIELD OF THE INVENTION

The present invention relates generally to e-commerce and, more particularly to systems methods and articles of manufacture for Internet based affiliate pooling across existing affiliate system boundaries.

BACKGROUND OF THE INVENTION

Presently, both Merchants and consumers are increasingly conducting aspects of their commerce via a network of computers known as the Internet. Such business is commonly referred to as "e-commerce," or "electronic commerce."

The Internet enables vast and immediate interconnectedness through the use of a common software structure, generated and read via computer code known as hypertext markup language or "HTML." Access to information and movement around the web is enhanced through the use of hyperlinks ("links") within a web page's HTML. The link, manifest as a word in a text field or an image on a web page, acts as a path, moving a user from one web page address, known as a Uniform Resource Locator (URL), to another web page address.

The movement from one URL to another allows near-instant access to information, products, and services and is particularly well-suited to the exchange of information, goods, and services between buyers ("users") and sellers ("Merchants"). Such business is commonly referred to as "e-commerce," or "electronic commerce."

With the abundance of goods and services available, a problem arises in efficiently connecting an interested user with the appropriate information pertaining to the desired goods and/or services. A Merchant therefore must make known, or advertise, its URL in order to reach those users on the Internet that are interested in the goods and/or services offered. Hypertext links lend themselves to an active (rather than static) advertisement since they actually provide the user with a path or entry point to the Merchant's URL. Then, once at the Merchant's URL, the user can initiate a transaction.

By advertising through the use of hyperlinked banner images and/or text links, a Merchant may increase its sales by increasing the number of users (commonly referred to as "traffic") that visit their URL, and potentially increase transactions.

To this end, the Merchant must determine how and where on the Internet to advertise in order to maximize traffic that fits the Merchant's targeted market. In contrast to traditional static advertising, hyperlinked active advertising provides the opportunity to chart a transaction from inception to end, beginning with the initial movement from advertisement to Merchant URL, and ending with the user's completed transaction.

This tracking mechanism allows the Merchant to see where its traffic is coming from (i.e., from a given advertisement at a given URL). Further, the tracking mechanism allows the Merchant to determine advertising compensation based on quantity of traffic and/or the traffic's performance. Such a system, which relies on a tracking mechanism, is commonly referred to as an affiliate system.

Most Merchants currently utilize some form of affiliate system to increase sales, track traffic, and compensate Webmasters for referrals of traffic and/or transactions. Webmasters are the content providers of the Internet, who maintain URLs in order to disperse information and links to other URLs. These links are often in the form of a Merchant's advertisement, such as a banner ad. Therefore, the Webmaster directs traffic to given Merchants via their selection and placement of Merchant links. The Webmasters are then generally compensated according to a given scale or interval, based in some way on the referred traffic.

The growing popularity of affiliate systems among both Webmasters and Merchants has led to a wide array of resources addressing affiliate commerce. Such resources include search engines, directories, and compilations of Webmaster feedback relating exclusively to affiliate systems.

Two distinct models of affiliate systems have developed. The first is a stand-alone affiliate system for a single Merchant. The second type encompasses multiple Merchants within one master affiliate system.

FIG. 1 is an illustration showing a prior art stand-alone affiliate system 100. The stand-alone affiliate system 100 includes a group of Webmasters 102, and a Merchant affiliate system 104. The Merchant's affiliate system 100 is a full framework that operates the Merchant's affiliate program. Generally, the Merchant's affiliate system 100 includes the Merchant's back-end tracking mechanism, which keeps track of transactions and credits affiliates, the accounting system for payout of affiliates, the reporting system for reporting transaction statistics back to affiliates, and the support system for affiliate and technical support.

In use, the group of Webmasters 102 send traffic through the surrounding affiliate system 104. The traffic is tracked and any transactions initiated by the traffic are credited to the referring Webmaster. Each Webmaster has access to the full framework of affiliate services offered by the Merchant's affiliate system 104.

The stand-alone affiliate system 100 is utilized only by one Merchant and that Merchant's network of affiliated Webmasters 102.

As would be expected, the Merchant retains full access to and control of its affiliate system 104, as well as full responsibility for promotion, administration, and improvement of the system. A good example of a stand-alone affiliate system is that used by AMAZON.COM.

A number of shortcomings become evident in regard to the stand-alone affiliate system. First, from the Merchant's point of view, there is a large startup cost, since the Merchant needs to have its entire affiliate system 104 in place before even one Webmaster 102 can begin to refer transactions. Second, the stand-alone affiliate system suffers from slow growth, mainly due to a switch in target market, a switch from obtaining new consumers (users) to new Webmasters. The single Merchant may also fail to attract Webmasters simply due to the limited number of goods and/or services available for promotion. In addition, the stand-alone affiliate system 100 entails a continuing burden of administration, promotion of the system, and Webmaster relations, all of which can tax the single Merchant's resources.

In addition, there are several drawbacks to the stand-alone affiliate program from the Webmaster's 102 point of view. Generally, the Webmaster 102 can only represent the goods and/or services of a single Merchant. Ideally, a Webmaster 102 would offer a variety of goods and/or services to its traffic in order to generate increased revenue from the available customers. In order for a Webmaster 102 using the stand-alone affiliate system 100 to add a variety of Merchants to the Webmaster's web page, the Webmaster 102 must find and join multiple stand-alone programs. This makes administration of the Webmaster's business more complex because the Webmaster must then coordinate with many programs—each with its own terms, conditions, accounting, tracking and customer service—in order to keep abreast of the performance of the Webmaster's referred traffic.

FIG. 2 is an illustration showing a prior art affiliate hub system 200. The affiliate hub system 200 includes a group of Webmasters 202, a master affiliate system 204, and an affiliate network 206 having individual affiliate systems 208. The master affiliate system 204 processes Webmaster 202 information and organizes the Webmasters 202 into the networked affiliate programs 208 within. The group of Webmasters 202 send traffic through the surrounding master affiliate system 204 to the individual affiliate programs 208 within.

Each individual affiliate system 208 of the affiliate network 206 uses the framework of the master affiliate system 204. This framework includes a back-end tracking mechanism (which keeps track of transactions and credits affiliates), an accounting system for payout of affiliates, a reporting system for reporting transaction statistics back to affiliates, and a support system for affiliate and technical support.

Thus, each individual Merchant affiliate system 208 depends on the master affiliate system 204 to provide the framework for the Webmasters 202 with traffic to become affiliates and promote the Merchant's particular goods and/or services. Each networked Merchant affiliate system 208 uses the same group of Webmasters 202 and their traffic from within the master affiliate system 204. An example of an affiliate hub system is that used by LINKSHARE.COM.

Using the affiliate hub system 200, Webmasters can be affiliated with, or send traffic through, one or more of the networked Merchant affiliate systems 208. Webmaster can also be affiliated with, or send traffic through, the master affiliate system 204 (for example, a Webmaster already in the Linkshare network can promote Linkshare and earn commissions per referred new Webmaster who joins Linkshare).

The affiliate hub 200 addresses some of the weaknesses of the stand-alone system in bringing together groups of Merchants into one network. In addition to gaining the use of the framework of the master affiliate system 204, a Merchant entering the affiliate hub network 200 has immediate exposure to the Webmasters 202 within the hub 200, easing the growing pains of starting an affiliate program. The Webmaster also benefits from this system, with simplified, coordinated access to the goods and services of all Merchant affiliate programs in the hub. However, the Merchants must share the same resources for traffic (the group of Webmasters 202), and thus risk losing business to other Merchants in the hub 200.

SUMMARY OF THE INVENTION

The present invention addresses these needs by providing a method for affording virtual affiliates access to an existing affiliate system. First, having been assigned a source unique identifier (source Webmaster ID), each of a group of Webmasters operates a web site. Then a request for a target Merchant Web site is initiated by a user (web surfer) or by the Webmaster, which utilizes the source Webmaster ID and triggers a correlation function. The source Webmaster ID is correlated to a target Webmaster ID, which is a unique identifying code functional within the target Merchant's home affiliate system and which corresponds to the unique identification system of the requested Merchant's home affiliate system.

Next, an entry mechanism URL for a target Merchant's affiliate system is generated and returned, containing the correlated target Webmaster ID code. The entry mechanism URL enables a hand off of the user to the requested Merchant's affiliate system, which further recognizes the source affiliate system from which the referring Webmaster sends traffic.

In one embodiment of the present invention, transaction information is obtained from the target Merchant's home affiliate system for specified transactions. The transaction information may be obtained by granting an affiliate pooling system access to a server operated by the target Merchant's affiliate system and allowing the affiliate pooling system to retrieve stored transaction information from the server operated by the Merchant's affiliate system. Optionally, the transaction information may be obtained by granting the target Merchant's home affiliate system access to an affiliate pooling system server and allowing the target Merchant's affiliate system to transfer the transaction information to the affiliate pooling system server.

In another embodiment of the present invention, the received request further includes an identifier for the target Merchant's home affiliate system, and an identifier for the source affiliate pool of the referring Webmaster.

In a further embodiment of the present invention, the received source Webmaster ID code is correlated to the target Webmaster ID code by performing a lookup function utilizing the identifier for the source affiliate pool of the referring Webmaster and the unique identifier for the referring Webmaster. Optionally, the lookup function may provide the target Webmaster ID code from a block of designated codes from within the requested Merchant affiliate system.

In yet a further embodiment, a Webmaster operates a web site having a banner ad for a related Merchant affiliate system. Additionally, the banner ad may include a link that includes an identifier for the related Merchant affiliate system and a unique identifier for at least one of the plurality of Webmasters operating the web site. Also, the link may further include a URL for a virtual affiliate pooling system.

Advantageously, the present invention allows groups of Webmasters to participate in existing Merchant affiliate systems without the need of joining those Merchant affiliate systems.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
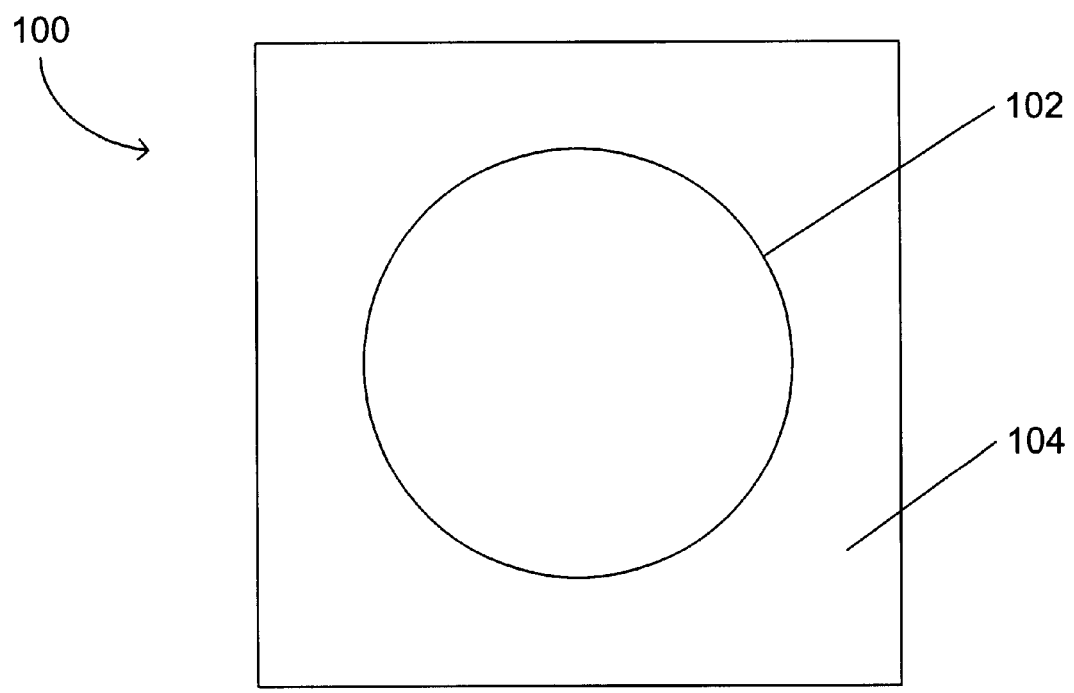
FIG. 1 is an illustration showing a prior art stand-alone affiliate system.

An invention is disclosed for Internet based affiliate pooling across existing affiliate system boundaries. In the following description, numerous specific details are set forth in order to provide a thorough understanding of the present invention. It will be apparent, however, to those skilled in the art, that the present invention may be practiced without some or all of these specific details in order to not unnecessarily obscure the present invention.

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Hyperlink. A navigational link from one document to another, or from one portion (or component) of a document to another. Typically, a hyperlink is displayed as a highlighted word or phrase that can be selected by clicking on it using a mouse to jump to the associated document or documented portion.

Hypertext System. A computer-based informational system in which documents (and possibly other types of data entities) are linked together via hyperlinks to form a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "amazon.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. (HTML 4.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET, causes the server to return the document or file located at the specified URL.

URL (Uniform Resource Locator). A unique address which fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

Cookies. A technology that enables a Web server to retrieve information from a user's computer that reveals prior browsing activities of the user. The informational item stored on the user's computer (typically on the hard drive) is commonly referred to as a "cookie." Many standard Web browsers support the use of cookies.

PUSH Technology. An information dissemination technology used to send data to users over a network. In contrast to the World Wide Web (a "pull" technology), in which the client browser must request a Web page before it is sent, PUSH protocols send the informational content to the user computer automatically, typically based on information pre-specified by the user.

Figure 3:
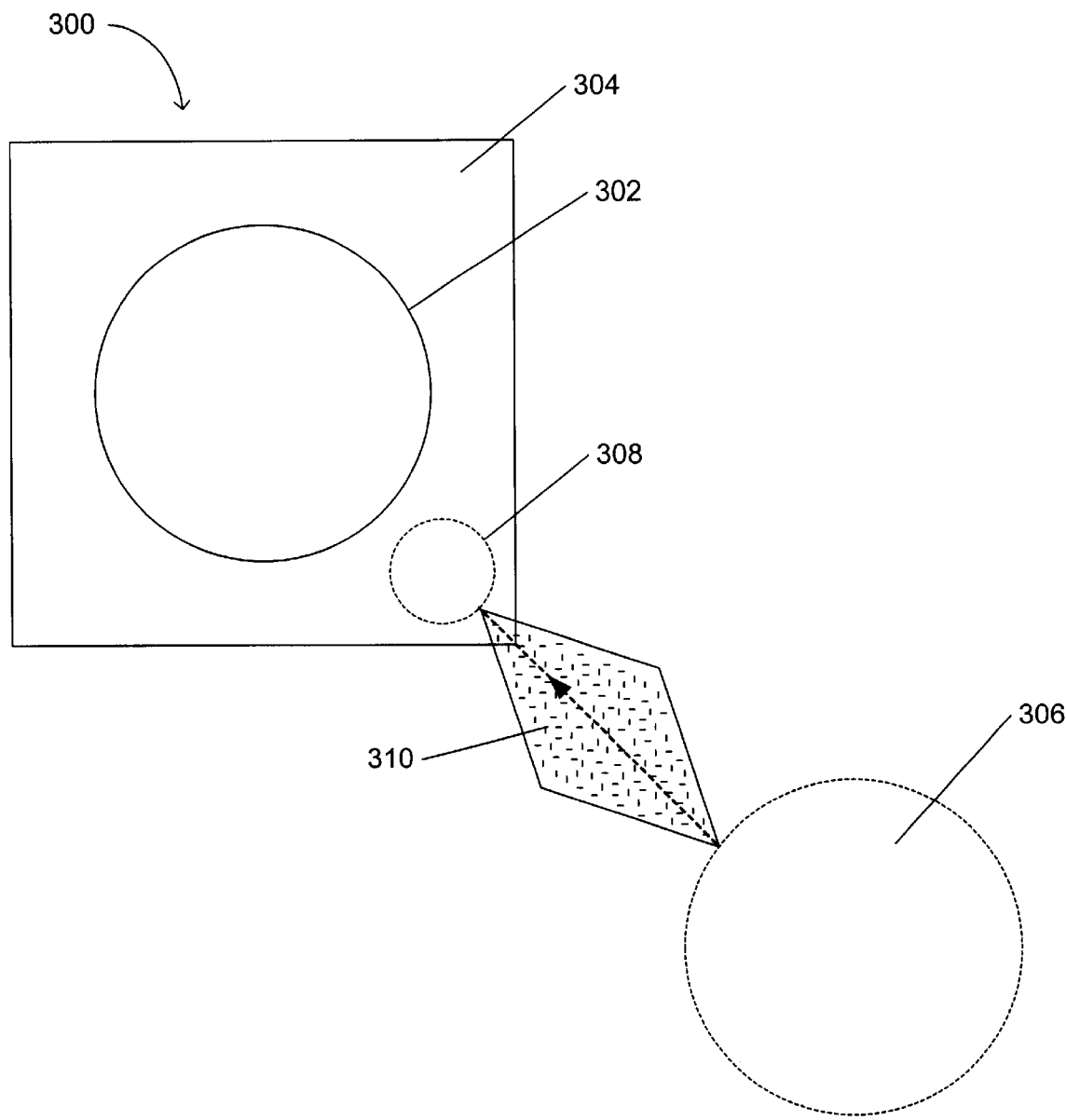
FIG. 3 is an illustration showing an affiliate pooling system in accordance with an embodiment of the present invention.

FIG. 3 is an illustration showing an affiliate pooling system 300 in accordance with an embodiment of the present invention. The affiliate pooling system 300 includes a group of Merchant affiliated Webmasters 302, a Merchant affiliate system 304, an affiliate pool of Webmasters 306, Virtual Affiliates 308, and a Virtual Affiliate system 310. The affiliate pool of Webmasters 306, the Virtual Affiliates 308, and the Virtual Affiliate system 310 may be added to an existing Merchant affiliate system 304.

The Merchant's affiliate system 304 is a full framework that operates the Merchant's affiliate program. Generally, the Merchant's affiliate system 304 includes the Merchant's back-end tracking mechanism, which keeps track of transactions and credits affiliates; the accounting system for payout of affiliates; the reporting system for reporting transaction statistics back to affiliates; and the support system for affiliate and technical support.

In use, the group of Merchant affiliated Webmasters 302 sends traffic through their surrounding Merchant affiliate system 304. The traffic is tracked and any transactions initiated by the traffic are credited to the particular referring Webmaster from within the group of Merchant affiliated Webmasters. Each Webmaster has access to the full framework of affiliate services offered by the Merchant affiliate system 304.

The affiliate pool of Webmasters 306 produces a quantity of traffic. The affiliate pool is a loose aggregation of Webmasters with a quantity of traffic, who may or may not already be utilizing a Merchant affiliate system or some master affiliate hub system. All that is required for a Webmaster to be considered part of the affiliate pool is the ability to send traffic through some affiliate system—that is, to have been assigned a unique identifying code (in order to track and credit referred transactions), as described in greater detail subsequently.

The Virtual Affiliates 308 are a subset of the Webmasters of the affiliate pool 306 with their quantity of traffic. Each Virtual Affiliate 308 sends traffic to the Merchant through the Merchant's existing affiliate system 304, and thus has the ability to benefit from advertising the goods and/or services of the Merchant while not wholly a part of the Merchant's existing affiliate system. In this way, the Virtual Affiliate Webmaster uses only a portion of the Merchant affiliate system's 304 framework (or resources).

The Virtual Affiliate remains independent from the Merchant's affiliate system. In addition, the Virtual Affiliate may remain anonymous to the Merchant's affiliate system, identified only as a member of the affiliate pool of Webmasters 306, as described in greater detail subsequently.

The Virtual Affiliate system 310 shows the flow of traffic, as the Webmasters in the affiliate pool 306 act as Virtual Affiliates 308 of the Merchant affiliate system 304, sending their quantity of traffic through the existing Merchant affiliate system 304.

Figure 4:
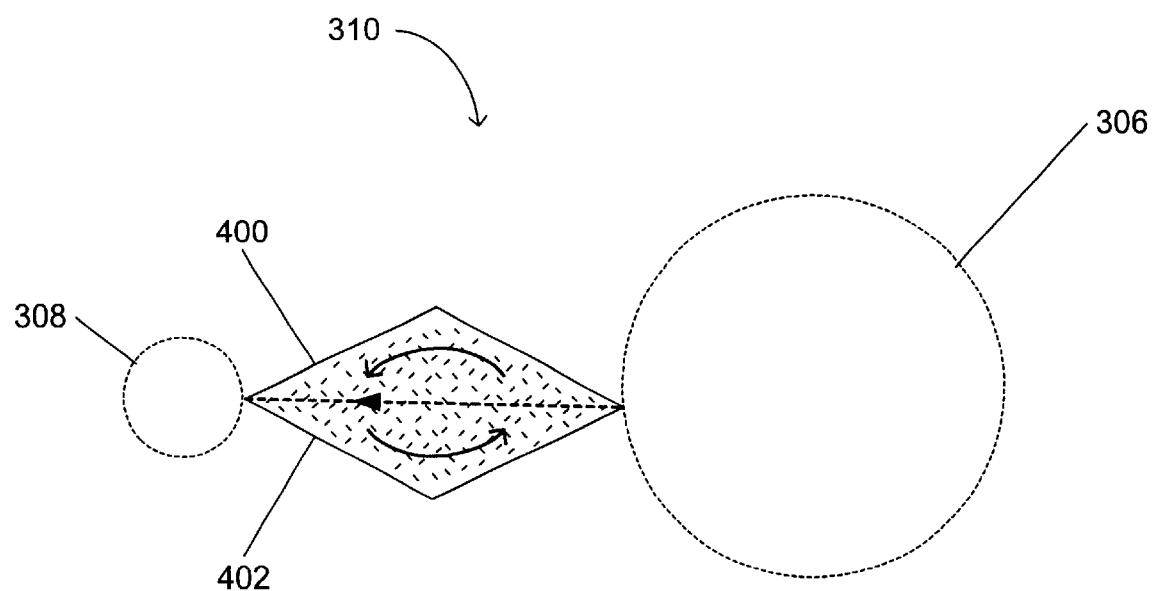
FIG. 4 is an illustration showing a virtual affiliate system, in accordance with an embodiment of the present invention.

FIG. 4 is an illustration showing a Virtual Affiliate system 310, in accordance with an embodiment of the present invention. The Virtual Affiliate system 310 includes a recognition system 400 and a transfer system 402.

As discussed in greater detail below, each Webmaster in the affiliate pool 306 has assigned to it a unique identifying code, referred to below as the "source Webmaster ID." Thereafter, traffic received from a particular Webmaster, which flows through the affiliate pooling system 300, includes the source Webmaster ID code for that particular Webmaster.

This source Webmaster ID is utilized by the recognition system 400 to perform an initial function that identifies the source Webmaster ID as from the affiliate pool and correlates it to another unique ID code that can be utilized by the particular Merchant's existing affiliate system, referred to below as the "target Webmaster ID." Incorporating this target Webmaster ID, the recognition system 400 correlates the IDs and returns a properly formatted entry mechanism, such as a URL, which enables the traffic to be handed off to and recognized by the particular Merchant's existing affiliate system. In this manner the Webmaster participates as a Virtual Affiliate 308 of the Merchant's affiliate system.

The transfer system 402 receives or retrieves information from a Merchant's affiliate system concerning transactions initiated by the traffic referred by the Webmasters in the affiliate pool 306. Generally, the transfer system 402 re-correlates each target Webmaster ID (from a particular Merchant's affiliate system) to a source Webmaster ID (from the affiliate pool). This information is then saved and processed for subsequent reporting and payout, as discussed in greater detail below.

Figure 5:
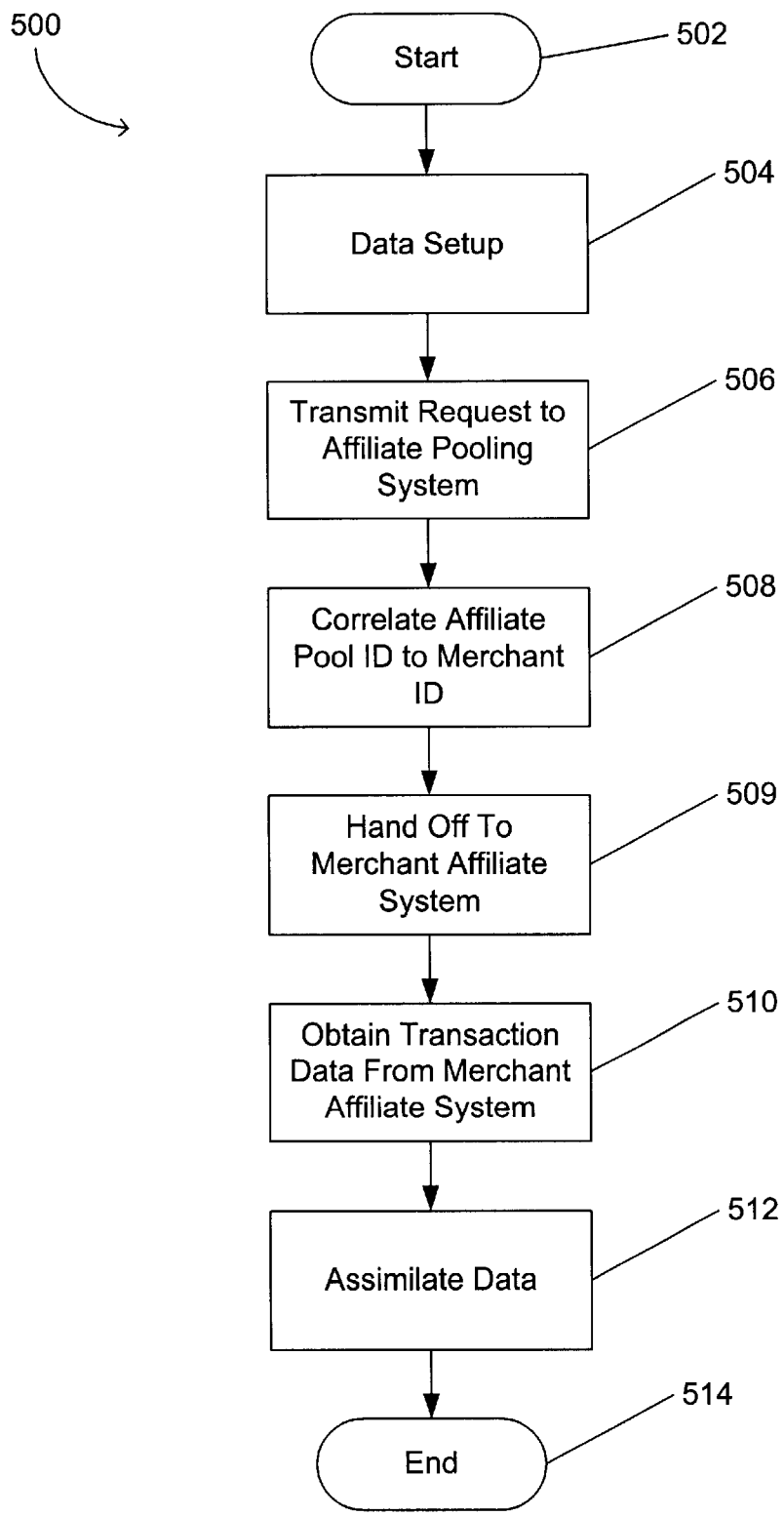
FIG. 5 is a flowchart showing a method for virtual affiliate pooling in accordance with one embodiment of the present invention.

FIG. 5 is a flowchart showing a method 500 for Virtual Affiliate pooling in accordance with one embodiment of the present invention. In an initial operation 502, pre-process operations are performed. Pre-process operations include gathering Webmaster information for each Webmaster of the affiliate pool and other pre-process operations that will be apparent to those skilled in the art.

In a data setup operation 504, participating Merchant systems and participating Webmasters are configured to utilize the affiliate pooling system of the present invention.

As part of the data setup operation 504, any guidelines for integration of the Virtual Affiliate system and the existing Merchant affiliate system are laid out such that the subsequent operations (i.e., correlation 508, hand off 509, data obtaining 510, assimilation 512) between the systems can be executed. The configuration guidelines that are set can be accessed as necessary by any subsequent operation.

The configuration information will include guidelines that ensure that the Merchant affiliate system is able to recognize that a given segment of traffic originates from some Webmaster from a source affiliate pool, and that the Merchant affiliate system is able to relay back to the Virtual Affiliate system information regarding all completed transactions referred from the affiliate pool. These recognition and transfer functions are significant parts of the operations described in more detail hereinbelow.

The configuration information may include syntax of the URL links which Webmasters post on their sites, used in a transmitting operation 506, as described in more detail below.

The configuration information may include designation of the particular blocks or sequences of unique identifying codes within each participating system to be correlated to each other, or rules for generating correlated codes "on the fly," used in a correlation operation 506, as described in more detail below.

The configuration information may further include designation of the syntax/format of the correlated output such that it is recognized by the Merchant affiliate system and can be handed off to it, in a hand off operation 509, as described in more detail below. For example, redirection to the target Merchant affiliate system in this hand off operation can come in the form of a specified URL syntax.

The configuration information may also include parameters for a data obtaining operation 510 (in which information from Virtual Affiliate-referred transactions is passed back to the Virtual Affiliate system); this includes, for example, choosing the mode of transfer and specifying the type and level of data content to be included in the transfer. At least one transfer mode should be chosen for the information to be passed from the Merchant affiliate system to the Virtual Affiliate system. These modes may include e-mail, file transfer protocol, script calls and manual entry of the information to an affiliate pooling system server. A determination as to the content of the information that is to be passed back to the Virtual Affiliate system should be made at setup. The content of information that is passed back may be different for each Merchant affiliate system that is used in connection with the affiliate pooling system. The content of information may vary depending upon the type of commerce and the tracking and reporting capabilities of the Merchant affiliate system with which the affiliate pooling system operates.

The configuration information may include rules for reporting of transaction statistics, as used in an assimilation operation 512, as described in more detail below. For example, these rules may specify the interval of reporting (such as per day, per month, or real-time), treatment of erroneous or fraudulent transaction data, and terms of compensation for referring Webmasters (e.g., the Webmaster may receive a given unit per transaction, or a given percentage per transaction), such that revenue totals can be calculated.

Also as part of a data setup operation 504, Webmasters in the affiliate pool are configured to operate with the affiliate pooling system. Each Webmaster from the affiliate pool of Webmasters has a quantity of traffic. As part of the setup operation, each Webmaster is assigned or verified to possess a unique identifying code (source Webmaster ID). This source Webmaster ID is the only information necessarily taken from the affiliate pool of Webmasters when used in conjunction with a Merchant's existing affiliate system. All other information (e.g., names, Social Security Numbers, or address of Webmasters, which are required for them to be compensated) can remain behind, such that the Webmaster is rendered anonymous to the Merchant affiliate system. This possibility for anonymity represents a significant advance over prior art, which limit the influx of traffic to only that which is completely tracked by and utilizes the full resources of the home system. Use of the Virtual Affiliate system allows for some responsibility to be removed from the Merchant, in terms of maintaining and expending system resources toward its relationship with the referring Webmaster. The Merchant is allowed to expand without the additional burden of keeping track of all the identifying data for every Webmaster who refers traffic, nor does the Merchant need to sign up, report on, pay out, or provide customer/technical support to every party who sends traffic to the Merchant system. Also, this anonymity feature provides added security to the Virtual Affiliate system in that the Merchants are not able to bypass the Virtual Affiliate system which some Merchants may see as a middleman. However, depending on preference and configuration, the participating systems may choose to forgo some portion or all of this anonymity feature and expend system resources to more fully participate in the relationship with Virtual Affiliate Webmasters.

As part of the Webmaster data setup operation 504, a Webmaster may first be introduced to the affiliate pooling system of the present invention by visiting a web site sponsored by the affiliate pooling system that outlines the terms and conditions of becoming a Virtual Affiliate. The terms may vary for each Merchant affiliate system participating in the affiliate pooling system. The unique identifying code (source Webmaster ID) for the Webmaster may be assigned when the Webmaster creates an online account with any of the various Merchant affiliate systems to which access is provided through the affiliate pooling system, or with the affiliate pooling system itself.

Each Webmaster then utilizes the source Webmaster ID in order to send traffic which is "trackable" through a system. In a preferred use, the source system can provide the Webmaster with properly formatted links, which will each contain the source Webmaster ID. The Webmaster can copy and paste these HTML coded links directly into their web pages. These links then are utilized by users of a web page to transmit requests for a Merchant whose products or services are being advertised, as described in greater detail below.

In a transmitting operation 506, a request is transmitted to the affiliate pooling system which contains 1) the unique identifying code for the Webmaster within his origin affiliate system (source Webmaster ID), and 2) some identifier for the Merchant whose product or service is offered (target system identifier). The URL may also contain information identifying the source affiliate system of the Webmaster (a source system identifier), either explicitly within the URL or somehow based on other information within the URL (such as the source Webmaster ID) in combination with a previously determined rule from the configuration information from data setup operation 504.

In use, the transmitted request can be initiated when a user (i.e., traffic of the Webmaster from the affiliate pool) clicks a URL (on the Webmaster's web site) which contains the source Webmaster ID and identifies the target Merchant system whose products or services are being advertised. Alternately, the request can be initiated by the Webmaster himself, or by the affiliate pooling system itself, such that the correlation operation described in detail below has already happened when a user visits the Webmaster's site, and the user can thus directly click the returned entry mechanism URL for hand off to the target system, as described in more detail below.

Next, in a correlation operation 508, the affiliate pooling system receives a request for a target Merchant URL and correlates and processes the request. In this operation, the affiliate pooling system parses the request to determine the unique ID of the referring Webmaster (source Webmaster ID).

As part of the correlation operation, the Virtual Affiliate system also recognizes the source system from which the traffic comes and in which this referring Webmaster participates. This source system can be an existing Merchant affiliate system, or the affiliate pooling system itself, and corresponds to the system from which the referring source Webmaster obtained his source Webmaster ID. Recognition of the source system can occur via an identifier (source system identifier) in the URL request that is received by the affiliate pooling system, or via a rule previously determined in the configuration of the participating systems, as described in more detail previously and hereinbelow.

From the request, the affiliate pooling system knows which Merchant is the target of the request, such that the Webmaster's unique ID for the affiliate pooling system (source Webmaster ID) can then be correlated to a unique ID for the Merchant's affiliate system (target Webmaster ID).

Correlation can occur in a number of ways. For example, the Merchant may have previously allocated a sufficiently large number of unique ID's from within its existing affiliate system, reserved (or blocked off) for use with the affiliate pooling system. As needed (on the fly, or having been assigned previously), the lookup table matching the existing Merchant system's ID (target Webmaster ID) to the appropriate source Webmaster ID from the affiliate pool is created or augmented. Accordingly, when the pooling system utilizes webmaster identifiers that are different from the target Merchant affiliate system's identifiers, the Webmaster ID's can be referenced using a lookup table that cross-references the two codes.

The Merchant affiliate system may also use a hybrid string of characters as a target Webmaster ID for identifying Webmasters associated with the affiliate pooling system. For example, the first portion of the code may be an acronym for the source system from which the Webmaster is sending traffic, while the next portion may consist of numbers that represent the particular source Webmaster ID assigned to the Virtual Affiliate Webmaster. In this respect, the Merchant affiliate system recognizes that a transaction originates from the respective source system and recognizes the new target Webmaster ID such that the Merchant's existing tracking can take over.

As another alternative for setting up the Virtual Affiliate system to interact with an existing Merchant affiliate system, the Merchant can set up custom interfaces (for example, using a scripting platform like CGI, PHP, Apache, Perl, etc.), in order to incorporate variables which designate the source Webmaster as a Virtual Affiliate. Traffic sent to the target Merchant's system is recognized as originating from the source system based on the variables present or use of the interface. The variables can be set in hidden HTML in a web page or as part of the URL. In most cases, the hidden HTML and the URL are treated the same; thus it wouldn't make a difference which was used in a particular situation.

In a hand off operation 509, the affiliate pooling system hands off the traffic to the target Merchant affiliate system. In order for the hand off to the Merchant affiliate system to run smoothly, the Merchant should be prepared to recognize traffic from the Virtual Affiliate system, as described above. The Merchant system should further recognize the target Webmaster ID and URL syntax such that the Merchant's tracking mechanism can take over, as described above.

In most cases, the Merchant has some mechanism in place for keeping track of traffic and resulting transactions; this is done using any number of methods, which will be apparent to those skilled in the art, and include use of referring URL's, unique ID numbers, user IP's, cookies, or session variables. For those Merchants that do not have this capability, a type of setup that incorporates customized compatibility between the affiliate pooling system and the existing Merchant affiliate system may be provided.

No separate transaction payment system, including authorization or processing of user-requested transactions for Merchant goods and/or services, is necessary with the present invention since it uses the existing transaction payment system of the Merchant's e-commerce setup.

The hand off to the Merchant affiliate system for processing of any initiated transactions includes the target Webmaster ID. The Merchant affiliate system then processes the rest of the user request, including completing transactions for the user. The Merchant affiliate system tracks all transactions occurring for each unique target Webmaster ID. This tracked data is then obtained by the Virtual Affiliate system, as described below.

In a data obtaining operation 510, the Virtual Affiliate system obtains transaction data from the Merchant affiliate system. There are generally two methods of obtaining this information from the Merchant affiliate system: retrieving and receiving.

Retrieval of information is scheduled, such that at a designated time or interval the Virtual Affiliate system is granted access to the relevant transaction data of the Merchant's affiliate system, via the process for retrieving data from a remote server. The affiliate pooling system may receive and retrieve information through a server computer with a database.

Receipt of transaction data can occur either on a schedule or in real time. Scheduled receipt of transaction data occurs using the same method and process as "retrieving" the data, as explained above, except reversed. That is, the Merchant affiliate system is granted access to an area of the Virtual Affiliate system, and transfers the retained data to this area via the process for transferring data between remote servers.

Real-time receipt of transaction data occurs as follows: a given transaction is processed, and as soon as the transaction is completed, the mechanism that completes the transaction automatically sends an impulse to the Virtual Affiliate system, relating or containing information about the transaction's occurrence.

The information that is reported back to the Virtual Affiliate system includes at the very least the target Webmaster ID of the referring Webmaster, and may also include relevant transaction data, such as a transaction date, a transaction amount, an order number, customer information, product information, and so on. The level and type of transaction data available will vary depending on the type of commerce, on the tracking and reporting capabilities of the Merchant affiliate system with which the affiliate pooling system operates, and most importantly, on the configuration information for that Merchant affiliate system, as determined in a data setup operation 504.

The information that is transmitted back to the Virtual Affiliate system may be transmitted through a variety of means. The mode may be e-mail, file transfer protocol, a direct call from the target Merchant's system, or manual entry. E-mail may be used for processing that is practically real time. E-mail also represents an advantage since e-mails are filtered by author, subject or other criteria. The subject or author field may be used to quickly determine which Merchant has sent the information. E-mail is also a convenient means for delivery of transaction information since a message that is originally undeliverable may be re-queued for later delivery.

File transfer protocol also has its advantages. File transfer protocol is a set of guidelines and programs, and is commonly used to transfer files between different computers on the Internet. As discussed above, during a data setup operation, the systems may agree on a configuration whereby the Merchant affiliate system will maintain transaction information in a directory on a server that can be accessed via an FTP client. At designated times, the Virtual Affiliate system may access the network of a Merchant affiliate system to copy new transaction information or files from a directory to the Virtual Affiliate system. The access to the Merchant affiliate system may be initiated according to a Merchant-specific process, or subroutine, set to run at designated times; for example, the subroutine could run every quarter-hour, every half-hour, every hour, daily or weekly.

The direct call from the target affiliate system may also be used as a means of passing transaction information back to the Virtual Affiliate system. This method would involve passing the required information to the Virtual Affiliate system immediately upon completion of the transaction. Network dependability would be a factor in determining whether or not this method is feasible since network failures might result in a loss of information. However, the direct call may be re-queued in the same manner as a temporarily undeliverable e-mail. Also, it should be noted that the direct call is most akin to a real-time processing mode.

Manual entry of the transaction information is also an option. However, the costs associated with labor and the probability of human error in entering the transaction would make this option less preferred. The fact that the inaccurate entry of one letter or number could make such a difference with this transaction information teaches against using this mode. In the event this method is used, it can be used to directly enter the information into the Virtual Affiliate system. The information could be entered from a print-out, fax or other form into the Virtual Affiliate system via Web interface.

The obtained data is assimilated in a data assimilation operation 512. The data obtained from the target Merchant affiliate system is assimilated in order to enable compensation of the Webmasters for referred transactions, and to report transaction statistics back to these Webmasters. During this operation, the data obtained from the Merchant affiliate system is parsed and utilized by the Virtual Affiliate system, as described in greater detail subsequently.

The data assimilation operation 512 should have the capacity to extract relevant information from the transaction data which has been passed back from the Merchant affiliate system. The data assimilation operation 512 can be triggered by an impulse request for the obtained transaction/referral data, in the form of an impulse sent to the system. The impulse can be sent upon receipt of the obtained data above, according to a previously configured schedule, or by request of the source affiliate system. The impulse request contains information for the affiliate pooling system, namely the source system identifier, such that the configuration information for the source system can be located, and the reverse correlation can occur, as described in more detail below.

The data assimilation operation 512 should further have the capacity to perform a reverse correlation on the isolated target Webmaster ID (from the stored transaction data), in which the target Webmaster ID is correlated back to the source Webmaster ID for use by Virtual Affiliate system. That is, using the same database structure as the original correlation operation 508, the system correlates the previously designated (or created) ID code (the target Webmaster ID, corresponding to the coding system of the target Merchant affiliate system) with the source Webmaster ID. The reverse correlation returns the source Webmaster ID, along with the parsed relevant transaction data.

The data assimilation operation 512 should also have the capacity to perform auditing functions to verify the integrity of the data (e.g., to analyze transaction records thus eliminating duplicates or fraud), depending on the related commerce.

The data assimilation operation 512 should further have the capacity to update statistical information with the new information that has been passed back from the Merchant affiliate system. Once parsed, reverse correlated, and audited, the transaction information and the "refound" code may be packaged, and these packages of information may be inserted into the appropriate place in the database structure of the affiliate pooling system's centralized database, or may be sent to or retrieved by a source affiliate system server (for performing its own post-process operations such as reporting, payout, etc.).

In some cases, it may also be desirable for the data assimilation operation 512 to trigger e-mail notifications to the Webmasters themselves as to the receipt of transaction information that has been passed back from the Merchant affiliate system to the Virtual Affiliate system.

Finally, in operation 514, post-process operations are performed. Post-process operations include payment of Webmasters from the affiliate pool, and other post-process operations that will be apparent to those skilled in the art. The Virtual Affiliates receive payment based on the number and value of referred transactions. Payment processing is made based on the terms and conditions of the Webmaster's agreement to provide referral services to a Merchant. Since the affiliate pooling system is based on a centralized database, check printing, account maintenance and other administrative tasks can be achieved by way of a web interface.

The affiliate pooling system has the capacity to generate statistics based on the information received from the Merchant affiliate system. The information may be broken down into whatever form the affiliate pooling system desires. For example, the statistics may organized by type of commerce, or by product and/or service currently enjoying the largest number of completed transactions or best overall performance. In addition to transaction and revenue statistics, the Virtual Affiliate system can also report statistics relating to raw traffic. Statistics will reflect information based on the type of commerce involved, the tracking and reporting capabilities of the Merchant's existing affiliate system, and the configuration information specified at setup. This information will be available to Webmasters and/or Merchants participating in the affiliate pooling system and will generally assist in improving marketing practices.

Figure 6:
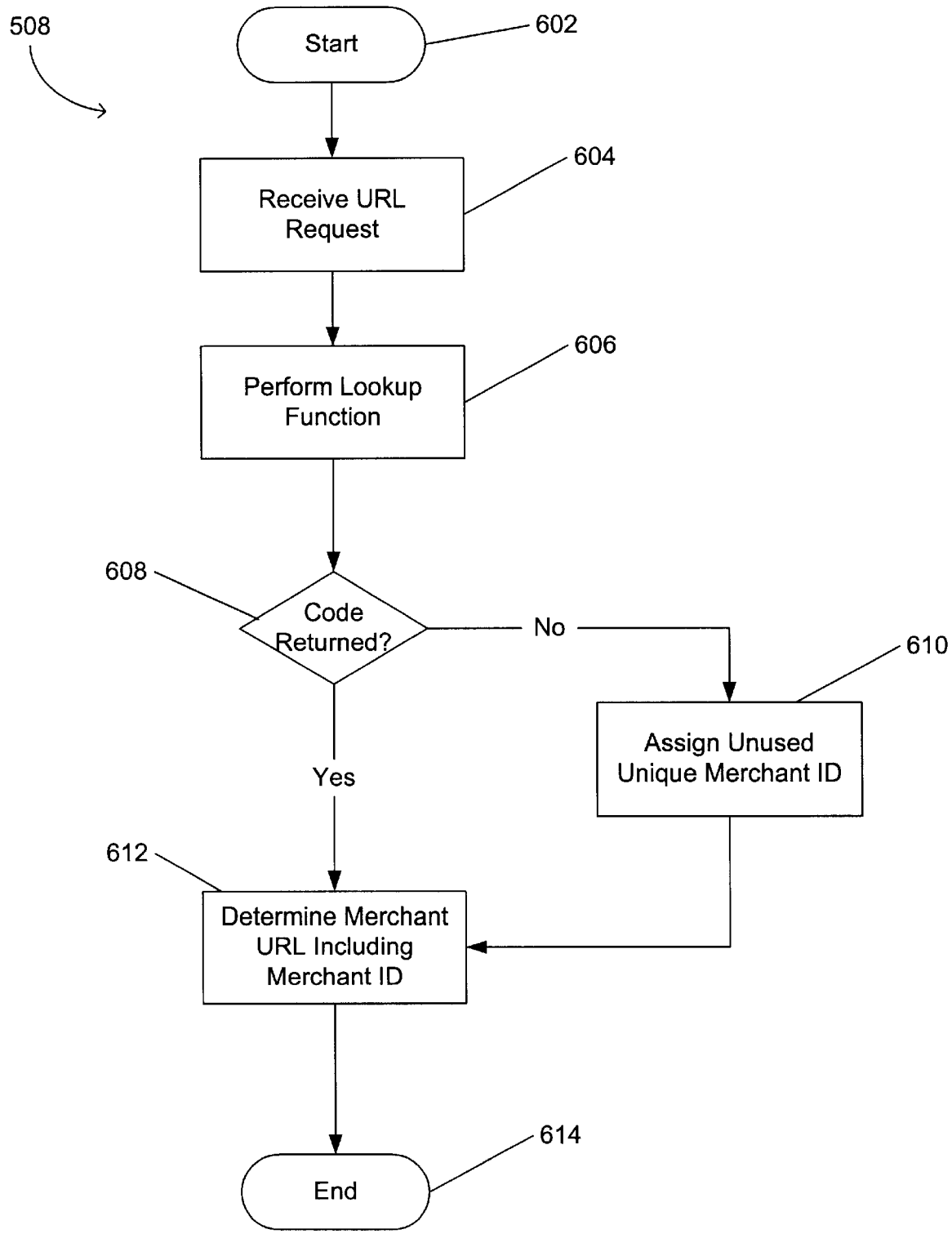
FIG. 6 is a flowchart showing a method for processing and correlating user request data, in accordance with an embodiment of the present invention.

FIG. 6 is a flowchart showing a method 508 for processing and correlating user request data, in accordance with an embodiment of the present invention. In an initial operation pre-process operations are performed. Pre-process operations include assigning or verifying the presence of Webmaster unique identifier codes and other pre-process operations that will be apparent to those skilled in the art.

In a receiving operation 604, a URL request is received by the affiliate pooling system. As described previously, the URL received includes the following information: 1) the unique identifying code for the Webmaster within his origin affiliate system or pool (source Webmaster ID), and 2) some identifier for the Merchant whose product or service is offered (target system identifier). The URL may also contain information identifying the source affiliate system of the Webmaster (a source system identifier), either explicitly within the URL or indirectly via other information within the URL (such as the source Webmaster ID) in combination with a previously determined rule from the configuration information of the systems.

Next, in a lookup operation 606, a lookup function is performed. Specifically, the lookup function finds the database assigned to the target Merchant affiliate system (target system indentifier). Within this database are three fields of information: the source system information, the Webmaster's unique ID within this source system (source Webmaster ID), and a unique identifying code from a block of designated identifiers within the target Merchant's affiliate system (target Webmaster ID). The database is then used to determine a correlating target Webmaster ID for the referring Webmaster. This identifier is then returned as an affiliate tracking code for use within the Merchant's existing affiliate system.

Depending on the complexity of the system, a database entry for a Webmaster may also include any additional unique identifiers, which would reference the source-target entry and could be used for additional or internal tracking by the affiliate pooling system.

The system of the present invention thus does a look up with the two pieces of source information (source system identifier and source Webmaster ID) to determine a correlated code for the target Merchant affiliate system.

A decision is then made as to whether a code has been returned by the system, in operation 608. If a code has not been returned, the method continues with an assignment operation 610. However, if a code has been returned, the method continues with an operation 612.

In an assignment operation 610, an unused target Webmaster ID is assigned to the referring Webmaster. If no correlated code is returned, the referring Webmaster has not yet sent ANY traffic through this mechanism (has not acted as a Virtual Affiliate). So an unused unique ID is then assigned from a block of designated codes within the target affiliate system. And, on subsequent lookups for this Webmaster's target Webmaster ID (as a result of subsequent referred transactions), the previously assigned code will be returned.

In a new URL determination operation 612, a new URL is determined based on the target Merchant and the target Webmaster ID. Once the correlated ID number for use by the target Merchant affiliate system is determined by the lookup function, the system returns a new URL, containing the "looked up" code and acting as an entry mechanism into the target Merchant's existing affiliate system. The format of the URL (i.e., syntax for the location of the target Merchant affiliate system) is determined using the configuration information specified during a data setup operation, as described in greater detail above. At this point, the user (traffic) is handed to the Merchant, and the transaction is then either completed or abandoned.

In one instance of real time use, the user begins by requesting one URL, but by the time the lookup function is done, the URL is transformed, thus re-directing the user to another URL immediately.

In this way, the Virtual Affiliate needs only to utilize the tracking mechanism of the target Merchant's affiliate system, not the entire affiliate system (i.e., not the accounting system, reporting system, support system, etc.). The target Webmaster ID (supplied in the URL) is retained by the Merchant affiliate system, along with the other transaction statistics that are collected by the Merchant's own processing of transactions (for its own affiliate system or otherwise), including date of transaction, time, order number, order total, itemized order information, etc. The retained information is then passed back to the affiliate pooling system, as described in greater detail above.

Finally, in operation 614, post process operations are performed. Post process operations include data assimilation and other post-process operations that will be apparent to others skilled in the art. As described above, transaction data is assimilated in order to enable compensation of the Webmasters for referred transactions by the source system, as well as report transaction statistics back to these Webmasters.

Figure 7:
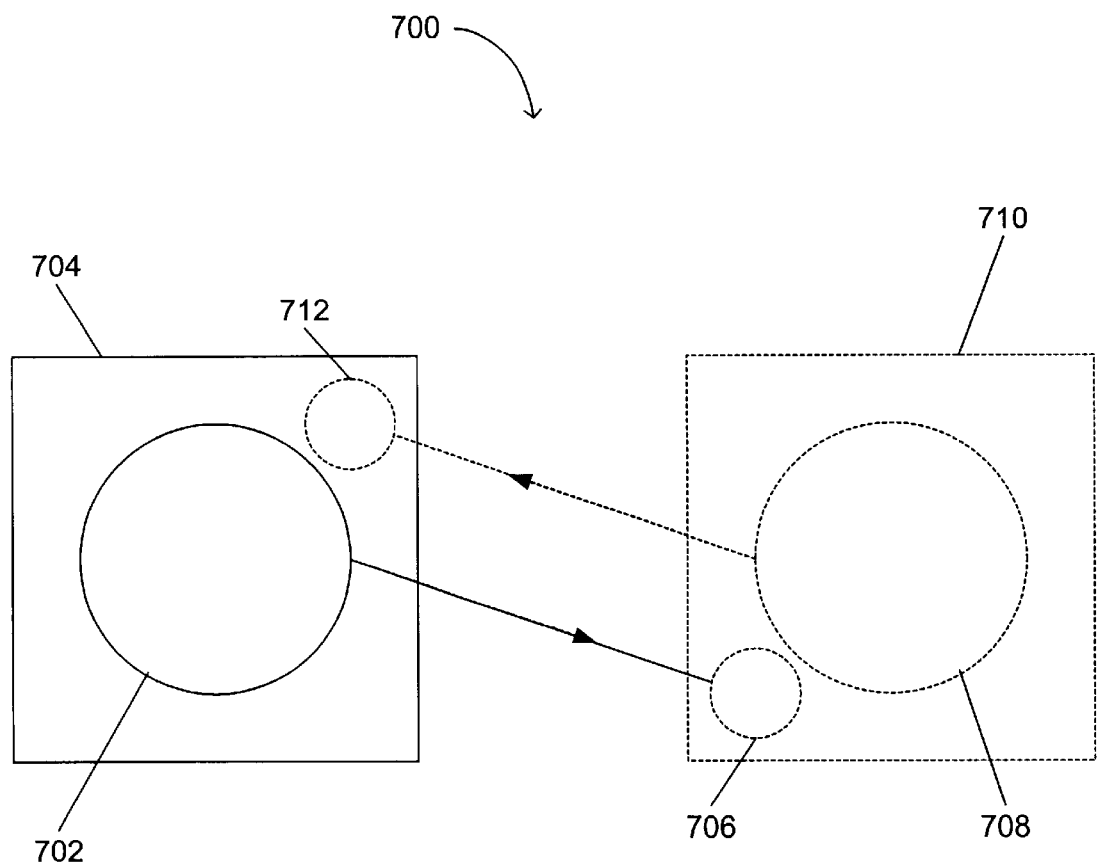
FIG. 7 is an illustration showing a complimentary affiliate pooling system, in accordance with an embodiment of the present invention.

FIG. 7 is an illustration showing a complimentary affiliate pooling system 700, in accordance with an embodiment of the present invention. The complimentary affiliate pooling system 700 includes a first group of Merchant affiliated Webmasters 702, a first Merchant affiliate system 704, a first Virtual Affiliate pool 706, a second group of Merchant affiliated Webmasters 708, a second Merchant affiliate system 710, and a second Virtual Affiliate pool 712.

In this embodiment, the present invention enables a first existing Merchant affiliate system 704 to send traffic or Virtual Affiliates 706 from its own system to a second Merchant affiliate system 710.

In addition, the second Merchant affiliate system 710 sends traffic or Virtual Affiliates 712 from its own system to the first Merchant affiliate system 704.

The present invention thus allows these two distinct and separate affiliate systems 704,710 to share respective sets of Virtual Affiliates 706,712. The two affiliate systems remain independent and distinct, retaining their own systems. The invention allows the two to integrate without utilizing the same system and without taking Webmasters from one another.

The following is an exemplary use of the embodiment of the present invention shown in FIG. 7. In the following example Associate is a company implementing the present invention, that is further capable of installing a system utilizing the present invention on Merchant servers.

CDMerchant.com has its own Merchant affiliate system 704 for the promotion of its goods, namely music CDs.

CDMerchant.com comes to Essociate looking for ways to increase their sales/ traffic. Essociate advises CDMerchant.com that their customers are similar to the customers at MusicMemorabilia.com.

MusicMemorabilia.com has its own Merchant affiliate system 710 for the promotion of its goods, namely memorabilia relating to rock, jazz, and blues music.

An agreement is made between the three parties, such that Essociate will enable the two Merchants to share respective pools of Virtual Affiliates; that is, CDMerchant.com's affiliate Webmasters can become Virtual Affiliates 712 of Music-Memorabilia.com 710, and MusicMemorabilia.com's affiliate Webmasters can become Virtual Affiliates 706 of CDMerchant.com 704. The affiliates of CDMerchant.com gain the ability to offer the products of MusicMemorabilia.com and be compensated for referred transactions, without having to maintain a separate account with MusicMemorabilia.com's own affiliate system. Similarly, the affiliates of MusicMemorabilia.com gain the ability to offer the products of CDMerchant.com and be compensated for referred transactions, without having to maintain a separate account with CDMerchant.com's own affiliate system.

As part of the agreement, the parties define a transaction as the purchase of an item from either MusicMemorabilia.com CDMerchant.com. The parties also agree on a set commission structure for transactions. For example, MusicMemorabilia.com may pay out 15% of every referred sale, of which the referring Webmaster (from CDMerchant.com) gets 5%, CDMerchant.com gets 5%, and Essociate gets 5%; and CDMerchant.com may also pay out 15% of every referred sale, of which the referring Webmaster (from MusicMemorabilia.com) gets 5%, MusicMemorabilia.com gets 5%, and Essociate gets 5%.

Also, to facilitate this integration, MusicMemorabila.com defines a scheme for a block of unique identifying codes from its existing affiliate system. In this example, this block consists of the letters "cd" plus a four digit code. CDMerchant.com also sets off a block of unique identifying codes from its existing affiliate system for use by the MusicMemorabilia.com Virtual Affiliates.

Thus Essociate's affiliate pooling system enables the sharing of Webmasters across existing affiliate boundaries. CDMerchant.com and MusicMemorabilia.com do not have to release their own confidential Webmaster information (an asset itself), yet still gain the benefits of sharing Webmaster and their traffic. Both Merchants also gain traffic without having to dedicate resources to new affiliate Webmasters.

Webmaster Fred runs a site for his band at http://www.fred.com.

On his site, he participates in a Merchant affiliate system for CDMerchant.com (702). As a participant, he places banners and links on his band site, advertising the products of CDMerchant.com. These banners and links point to URLs that contain Fred's unique identifying code, 1001, for the CDMerchant.com affiliate system (704).

So the URL that Fred sends his traffic to may look like:

http://www.cdmerchant.com/affiliate/1001/product.html

User Gretta is interested in music. After seeing Fred's band, Gretta decides to visit the band's website at http://www.fred.com. After learning about the band from the information on this site, Gretta decides she would like to purchase one of their recommended CDs.

Fred's site provides a banner for CDMerchant.com and suggests clicking the banner to purchase any CDs. Gretta clicks on this banner and is taken to a URL on one of CDMerchant.com's servers.

http://www.cdmerchant.com/affiliate/1001/product.html

As stated, this URL contains the target address as well as Fred's unique identifying code for the CDMerchant.com affiliate system 704.

Gretta arrives at the specified URL, a page on CDMerchant.com's server. To ensure that Fred's potential sale is not lost, CDMerchant.com's affiliate system has sufficient tracking such that if Gretta completes a transaction during her visit, Fred is credited.

Because of CDMerchant.com's use of Essociate's affiliate pooling system, CDMerchant.com can expand the choice of links on its pages to include goods and service of MusicMemorabilia.com, without losing the ability to credit transactions to CDMerchant.com's referring affiliate Webmasters.

Thus, the URLs accessed by Greta after she moves from Fred's Web page to the Merchant's on-line store may contain a banner ad for MusicMemorabilia.com at the top of the page, with a URL that also contains Fred's unique identifying code (from the source CDMerchant.com affiliate system).

Alternatively, Gretta could get a "pop-up" window upon entry to CDMerchant.com, or upon exit, which would advertise and link to MusicMemorabilia.com. Or Gretta could see an interstitial, which is a temporarily loaded transition document, similar in many ways to a television commercial, and which would advertise and link to the goods of Music-Memorabilia.com. In any above case, the advertisements use links which each contain Fred's source Webmaster ID "1001."

Gretta arrives at a page containing the CD she was looking for. If Gretta purchases the CD during this visit, Fred will get credit for the transaction as part of the CDMerchant.com stand-alone affiliate system.

On the page, near the CD description, CDMerchant.com has placed an advertisement for MusicMemorabilia.com, stating "If you like this band, why not get one of their posters!"

As before, this ad contains a URL which contains Fred's CDMerchant.com source Webmaster ID, and because it is outside the scope of CDMerchant.com's products and tracking, the URL targets a location on Essociate's server. The URL also contains some identifier for MusicMemorabilia.com (target system identifier) and some identifier for CDMerchant.com (source system identifier) and may look like:

http://memorabilia.essociate.com/partners/cdmerch/1001/

The address includes the following: a target system identifier (in this example, memorabilia.essociate.com identifies the target as MusicMemorabilia.com), a source system identifier (cdmerch), and source Webmaster ID (1001).

The Essociate server receives (loads) the URL request, taking the information in the URL and processing it with a lookup function.

Specifically, the lookup function finds the database assigned to the target Merchant affiliate system (MusicMemorabilia.com). Within this database are three fields of information: the source system identifier (cdmerch), the unique Webmaster ID from this system (1001), and a unique identifying code from the block of previous described codes within the MusicMemorabilia.com affiliate system (a target Webmaster ID).

So, the Essociate system does a look up with the two pieces of source information, to determine a correlating MusicMemorabilia.com affiliate tracking ID.

In this example, Fred's CDMerchant.com code is 1001. Essociate's server looks up this source Webmaster ID and correlates it with the target Webmaster ID "cd1001."

Once the correlated ID number for the MusicMemorabilia.com's affiliate program is determined by the Essociate server's lookup function, the server returns a new URL, containing the "looked up" code for MusicMemorabilia, and then targets the location on MusicMemorabilia.com's server.

http://www.musicmemorabilia.com/affiliatepartners/cd1001/poster.html

In real time, this process is extremely fast from Gretta's point of view. Gretta begins by loading one URL, but by the time the lookup function is done, this URL is transformed, thus re-directing her to another URL almost immediately.

Gretta is now within MusicMemorabilia.com's site (712), specifically at a URL containing the new "looked up" identifying code.

Gretta purchases the poster, as well as some lyric sheets and a set of autographed guitar picks for $100.

Using only the tracking mechanism of the MusicMemorabilia.com affiliate system and/or shopping cart, the unique identifying code and transaction details are carried through to the completion of Gretta's transaction, and this information is then sent to or grabbed by an Essociate server.

In this example, MusicMemorabilia.com sends Essociate the transaction information (referring code and designated statistics) in real-time. So when Gretta completes her transaction (her credit card is charged), the MusicMemorabilia.com affiliate system automatically sends the information to a storage area on the Essociate server.

In this example, the information includes the target Webmaster ID (from MusicMemorabilia.com's affiliate system; "cd1001" in this example), the date and time of the order, the order number, and the total of the purchases.

Once on the Essociate server, the assimilation process begins when a request for the data is received by the Essociate server.

In this example, a request impulse is sent by CDMerchant.com's affiliate system once each hour. The request includes information that denotes that CDMerchant.com is the source Merchant affiliate system.

When Essociate receives the request, Gretta's transaction information, as well as all other referred transactions added during that hour are parsed (line by line, with one transaction per line).

In this example, the MusicMemorabilia.com target Webmaster ID from Gretta's transaction line is matched with the corresponding source Webmaster ID (Fred's code from the CDMerchant.com affiliate system) via a "reverse lookup" function.

Using the same database structure as the original lookup, the system correlates the previously designated (or created) target Webmaster ID (MusicMemorabilia.com) with Fred's source Webmaster ID (CDMerchant.com).

Gretta's transaction information is parsed according to the configuration information for CDMerchant.com's integration with MusicMemorabilia.com and Essociate. In this example, only the date and time of the transaction and the total of the purchase, and of course Fred's "refound" source Webmaster ID, are retained through the parsing process. In addition, compensation can be calculated for the parsed information using the configuration information for the participating systems.

In this example, the Essociate system calculates Fred's commission as $5.00 (5% of Gretta's $100 transaction).

The information (Fred's ID code, date/time of Gretta's transaction, $100 transaction total, and $5.00 commission amount for Fred) is packaged and sent to the CDMerchant.com affiliate system.

The CDMerchant.com affiliate system now takes over, using the data in the information packages to handle subsequent affiliate services for Fred, such as accounting services by paying Fred $5 for his referred transaction as a Virtual Affiliate, and reporting the transaction total and date and time of the transaction to Fred.

The same set of operations which enable affiliate pooling above also apply with the source and target roles reversed. In other words, MusicMemorabilia.com's existing affiliate system acts as the source system and allows its Webmasters to send traffic to CDMerchant.com (now figured as the target system) while retaining their identity as MusicMemorabilia.com affiliates.

So, a second Webmaster Ernie has a Web site where he places links and banners promoting MusicMemorabilia.com through MusicMemorabilia.com's existing affiliate system; and a given user (either Gretta or any other user visiting Ernie's Web site) clicks one of these banners and is taken to a URL within MusicMemorabilia.com's existing affiliate system. Upon the user's exit from the MusicMemorabilia.com site, a new browser window is automatically displayed which shows advertising information for CDMerchant.com and utilizes links which include Ernie's now correlated target Webmaster ID and direct the user to the CDMerchant target affiliate system. Thus MusicMemorabilia.com's use of the Virtual Affiliate system incorporates the correlation function directly into the exit traffic mechanism used by the source MusicMemorabilia.com affiliate system, correlating the source Webmaster ID to the target Webmaster ID automatically whenever an exit console for the target Merchant affiliate system is triggered. The exit console loads a URL such that Ernie will get credit for any referred sale at CDMerchant.com initiated during that visit, but will remain separate from CDMerchant's existing affiliate system.

It should be noted that both possible configurations of target and source systems discussed above, and their respective flows of traffic and Virtual Affiliates, can co-exist, operating simultaneously and in parallel.

Figure 8:
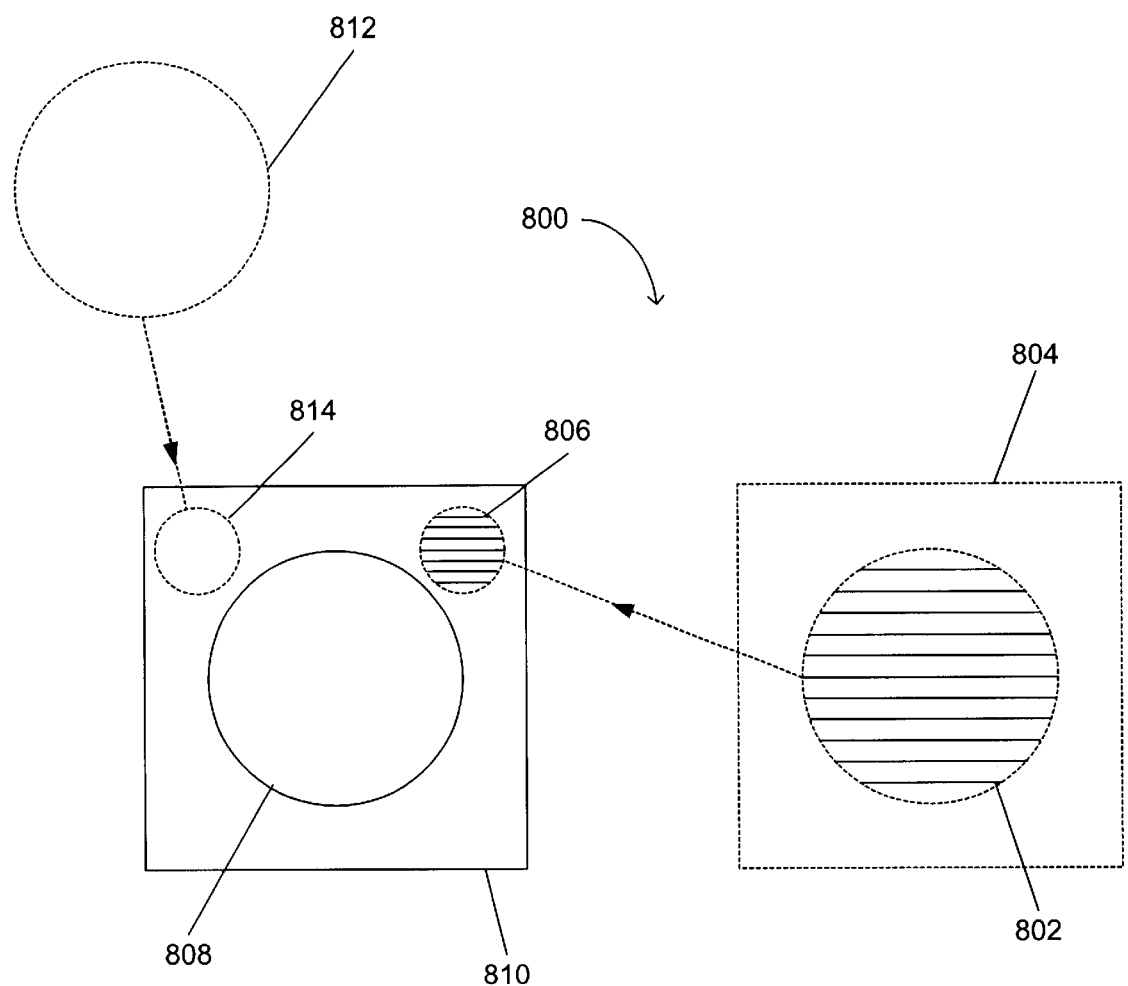
FIG. 8 is an illustration showing an affiliate pooling system, in accordance with another embodiment of the present invention.

FIG. 8 is an illustration showing an affiliate pooling system 800, in accordance with another embodiment of the present invention. The affiliate pooling system 800 includes a first group of Merchant affiliated Webmasters 802, a first Merchant affiliate system 804, a first Virtual Affiliate pool 806, a second group of Merchant affiliated Webmasters 808, and a second Merchant affiliate system 810. The affiliate pooling system 800 further includes a third group of Webmasters 812, and a third Virtual Affiliate pool 814.

In this embodiment, the present invention enables a first existing Merchant affiliate system 804 to send traffic or Virtual Affiliates 806 to a second existing Merchant affiliate system 810.

In addition, the present invention allows a third pool of Webmasters 812 (not necessarily associated with any existing Merchant affiliate system, but nonetheless possessing unique identifying codes) to be Virtual Affiliates 814 of the second Merchant affiliate system 810.

Thus the second Merchant affiliate system 810 benefits from increased traffic (and therefore more potential sales), without having to divert resources dedicated to its existing affiliate Webmasters 808 or to new Webmasters.

The first pool of Webmasters 802 and the first Merchant affiliate system 804 both benefit by being able to additionally promote the goods and/or services of the second Merchant 810, while still being credited for referred transactions and without having to leave the pool or affiliate system where they currently "reside" and conduct business.

Also, the second system's 810 own base of Webmasters 808 are not Virtual Affiliates for either of the other two participating systems (however, they could be in another given situation).

Figure 9:
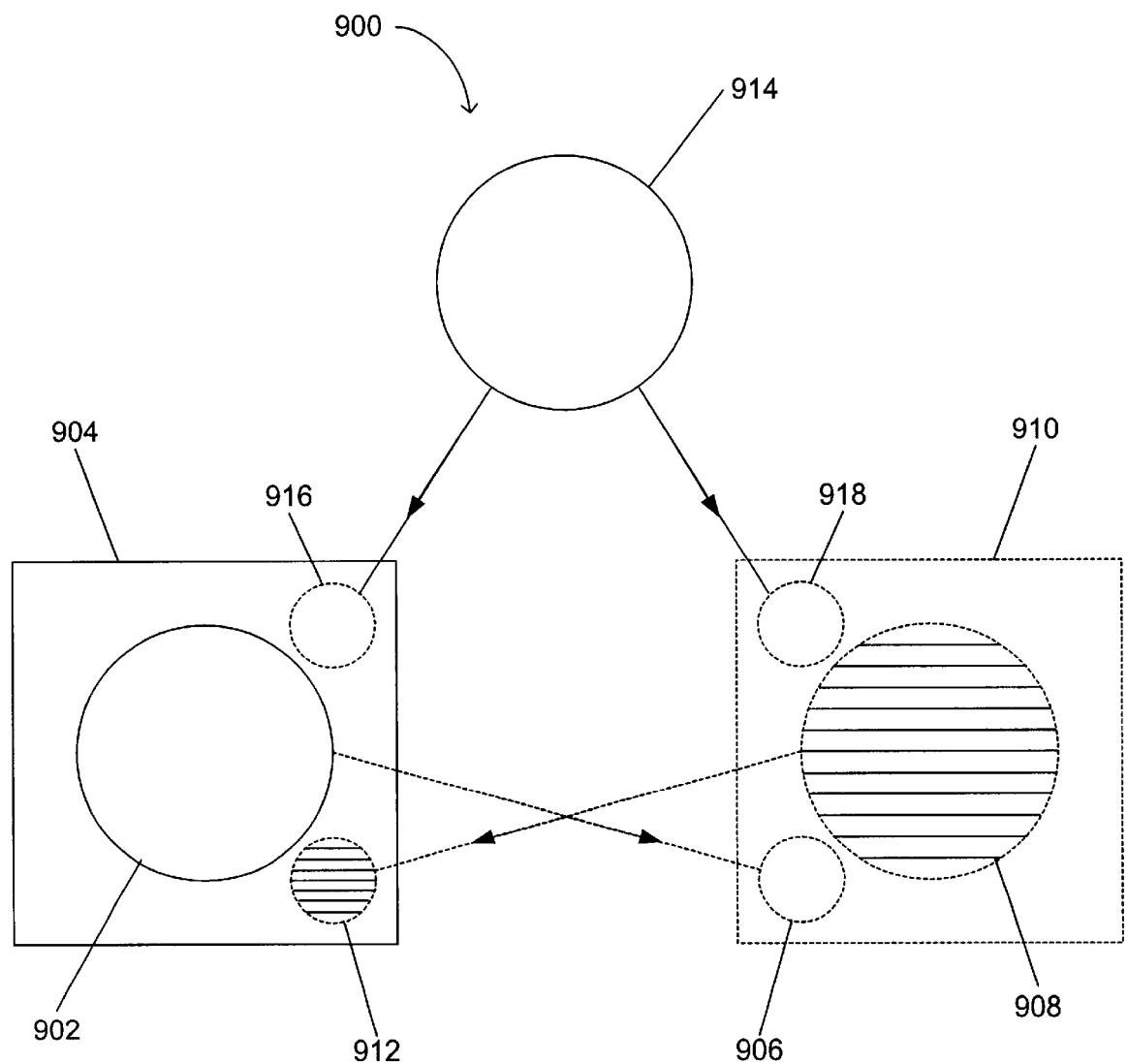
FIG. 9 is an illustration showing a complimentary affiliate pooling system, in accordance with yet another embodiment of the present invention.

FIG. 9 is an illustration showing a complimentary affiliate pooling system 900, in accordance with yet another embodiment of the present invention. The complimentary affiliate pooling system 900 includes a first group of Merchant affiliated Webmasters 902, a first Merchant affiliate system 904, a first Virtual Affiliate pool 906, a second group of Merchant affiliated Webmasters 908, a second Merchant affiliate system 910, and a second Virtual Affiliate pool 912. The complimentary affiliate pooling system 900 further includes a third group of Webmasters 914, and a third Virtual Affiliate pool 916 and a fourth Virtual Affiliate pool 918.

In this embodiment, the present invention enables a first existing Merchant affiliate system 904 to send traffic or Virtual Affiliates 906 from its own system to a second Merchant affiliate system 910.

In addition, the second Merchant affiliate system 910 sends traffic or Virtual Affiliates 912 from its own system to the first Merchant affiliate system 904.

The present invention thus allows these two distinct and separate affiliate systems 904,910 to share their respective sets of Virtual Affiliates 906,912. The two affiliate systems remain independent, using their own systems, and yet can share their Webmaster traffic without cannibalizing Webmasters from one another.

Additionally, the third pool of Webmasters 914 with unique identifying codes are Virtual Affiliates 916,918 of both existing Merchant affiliate systems 904,910, sending traffic through either or both of the existing systems, while still being credited for referred transactions and without having to leave the pool or affiliate system where they currently "reside" and conduct business.

Figure 10:
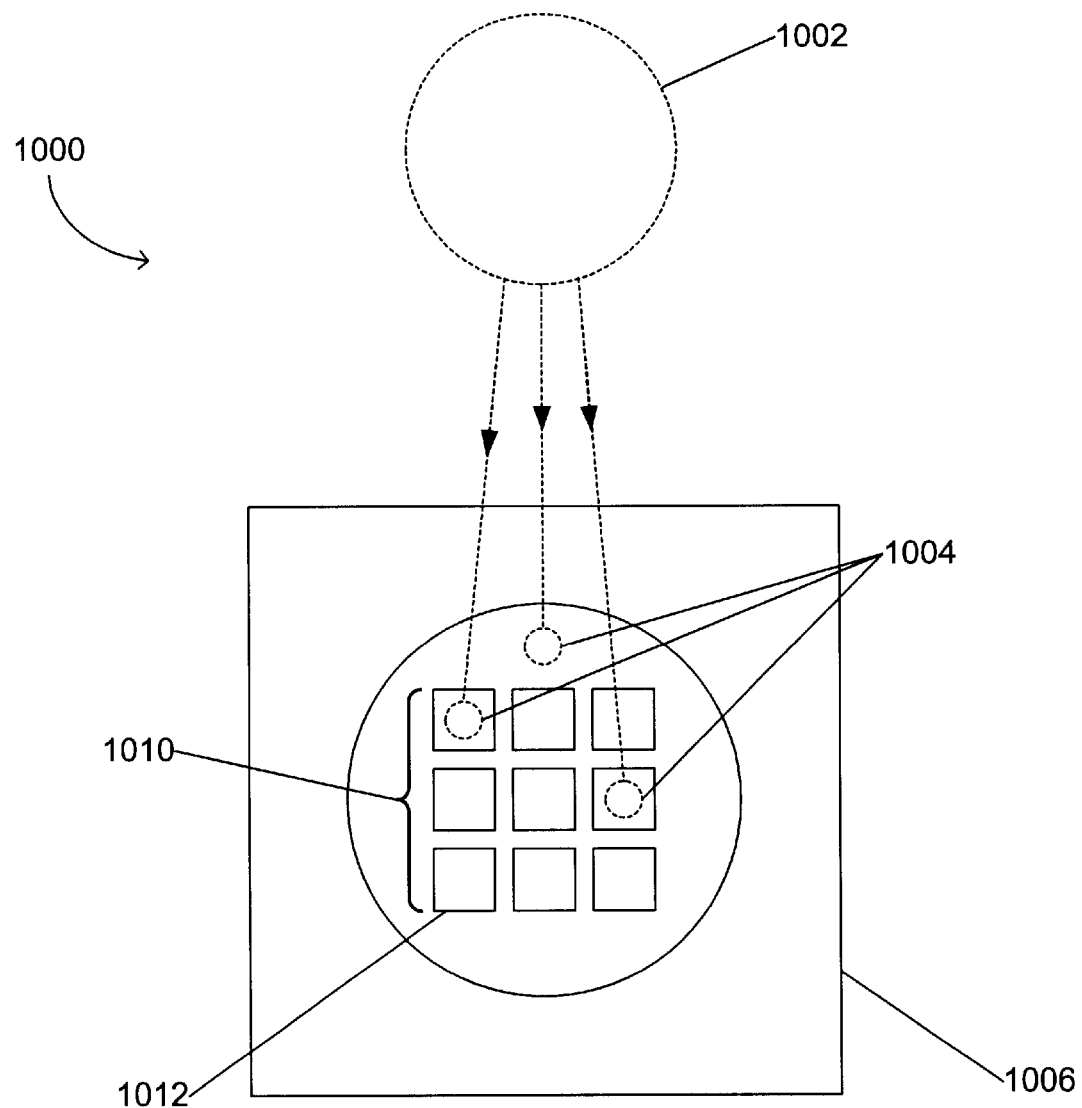
FIG. 10 is an illustration showing an affiliate pooling hub system, in accordance with a further embodiment of the present invention.

FIG. 10 is an illustration showing a affiliate pooling hub system 1000, in accordance with a further embodiment of the present invention. The affiliate pooling hub system 1000 includes a first group of Webmasters 1002, Virtual Affiliates 1004, a second group of Webmasters 1006, a Master Affiliate System 1008, and an affiliate network 1010 having individual affiliate systems 1012.

Figure 2:
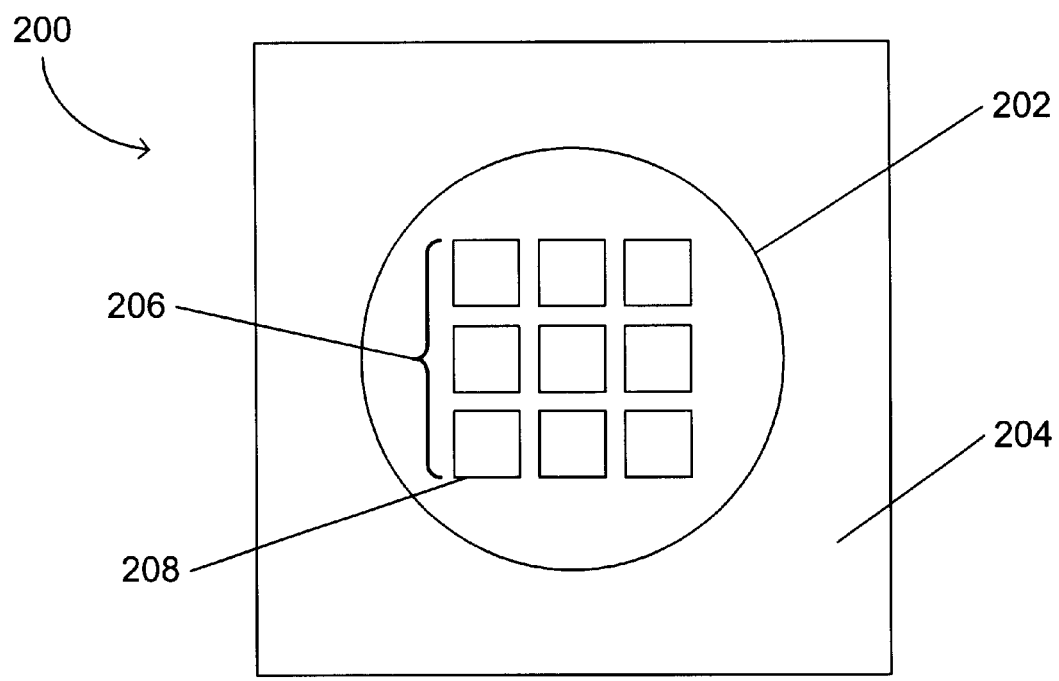
FIG. 2 is an illustration showing a prior art affiliate hub system.

The Master Affiliate System 1008 operates as described with respect to FIG. 2. However, in this embodiment, the present invention enables an existing affiliate pool 1002 to act as Virtual Affiliates 1004 for an existing Master Affiliate System 1008 with a number of networked affiliate systems 1010. An example of such a Master Affiliate System would be Linkshare.com.

Used in this way, the affiliate pooling hub system 1000 creates Virtual Affiliates 1004 from the affiliate pool 1002, allowing them to promote the goods and/or services of any one of the networked affiliate systems within the Master Affiliate System 1008. Yet, the Virtual Affiliates 1004 do not consume as many resources from the networked affiliate system 1010 or the Master Affiliate System 1008 as the true affiliated Webmasters 1006 of these systems.

The invention can be utilized with any one of the networked affiliate systems 1012, or all of them 1010, or with the Master Affiliate System 1008 itself.

It should be borne in mind that FIGS. 7, 8, 9, and 10 are examples of the use of the present invention. The use of the invention is not limited to these four examples. The invention actually enables combination or interconnection of any of the FIGS. 7, 8, 9, and/or 10, or of variations of them. FIGS. 7, 8, 9, and 10 could all be combined to represent some ubiquitous configuration, each linked with an affiliate system enabled by the present invention.

The system of the invention enables the creation of an architecture of affiliate systems as simple as FIG. 3, or an architecture of affiliate systems that extends ad infinitum.

While the present invention has been described in terms of several preferred embodiments, there are many alterations, permutations, and equivalents which may fall within the scope of this invention. It should also be noted that there are many alternative ways of implementing the methods and systems of the present invention. It is therefore intended that the following appended claims be interpreted as including all such alterations, permutations, and equivalents as fall within the true spirit and scope of the present invention.

What is claimed is:

1. A method for providing Virtual Affiliates to an existing target affiliate system, the method comprising the operations of:

configuring an existing target affiliate system to receive referrals from a first plurality of Webmasters in an affiliate pool of source Webmasters such that the target Merchant affiliate system recognizes a transaction as originating from a source Webmaster in an affiliate pooling system, including the step of:

assigning a source Webmaster unique identifier for each of said first plurality of Webmasters each operating at least one web site;

receiving a user request for a target Merchant affiliate system URL from a web site operated by a particular referring Webmaster of the first plurality of Webmasters, wherein the user request includes the source Webmaster unique identifier for the particular referring Webmaster, and wherein the target Merchant affiliate system includes a unique identification system for its own affiliated Webmasters;

correlating the received source Webmaster unique identifier to a target Webmaster unique identifier corresponding to the unique identification system of the requested Merchant affiliate system; and generating a URL for the requested Merchant affiliate system, wherein the URL includes the correlated target Webmaster Merchant unique identifier, whereby the URL can be utilized to access the requested Merchant affiliate system, and further provide identification of the source Webmaster for requisite tracking.

2. A method as recited in claim 1, wherein the operation of correlating the received source Webmaster unique identifier and generating a URL for the target Merchant affiliate system occur prior to the receipt of the user request for the target Merchant affiliate system.

3. A method as recited in claim 1, further comprising the operation of obtaining transaction information from the target Merchant affiliate system for specified transactions.

4. A method as recited in claim 3, wherein the transaction information includes a target Webmaster unique identifier, as well as other relevant transaction data, such as a transaction amount and a transaction date.

5. A method as recited in claim 3, wherein the transaction information is obtained by granting an affiliate pooling system access to a target Merchant affiliate system and allowing the affiliate pooling system to retrieve stored transaction information from said Merchant affiliate system.

6. A method as recited in claim 3, wherein the transaction information is obtained by granting the target Merchant affiliate system access to an affiliate pooling system and allowing said Merchant affiliate system to transfer the transaction information to the affiliate pooling system.

7. A method as recited in claim 1, wherein the received user request further includes an identifier for the target Merchant affiliate system, and an identifier for a source affiliate pool of the referring Webmaster.

8. A method as recited in claim 7, wherein the operation of correlating the source Webmaster unique identifier to the target Webmaster unique identifier comprises the operation of performing a lookup function utilizing the identifier for the source affiliate pool of the referring Webmaster and the source Webmaster unique identifier for the referring Webmaster.

9. A method as recited in claim 8, wherein the lookup function provides the target Webmaster unique identifier from a block of designated codes within the requested target Merchant affiliate system.

10. A method as recited in claim 1, wherein at least one of the plurality of Webmasters operates a web site having a banner ad for a related Merchant affiliate system.

11. A method as recited in claim 10, wherein the banner ad utilizes a link that includes an identifier for the target Merchant affiliate system whose banner is being displayed and a source Webmaster unique identifier for at least one of the plurality of Webmasters operating the web site.

12. A method as recited in claim 11, wherein the link further includes a URL for a Virtual Affiliate pooling system.

13. A method as recited in claim 1, wherein the operation of configuring a Merchant affiliate system to receive referrals from a first plurality of Webmasters, further includes the step of:

selecting at least one transfer mode by which transaction information is transferred from the target Merchant affiliate system to the affiliate pooling system.

14. A method as recited in claim 13, wherein at least one transfer mode is selected from the group consisting of electronic mail, file transfer protocol, script call and manual entry.

15. A computer program embodied on a computer readable medium for providing Virtual Affiliates to an existing affiliate system, the computer program code comprising:

a code segment for configuring an existing affiliate system to receive referrals from source Webmasters of an affiliate pool of Webmasters, including:
  a code segment for assigning a unique identifier for each of a first plurality of Webmasters each operating at least one web site;
  a code segment for receiving a user request for a target Merchant affiliate system URL from a web site operated by a particular referring Webmaster of the first plurality of Webmasters, wherein the user request includes the source unique identifier for the particular referring Webmaster, and wherein the target Merchant affiliate system includes a unique identification system for its own affiliated Webmasters;
  a code segment for correlating the received source Webmaster unique identifier to a target Webmaster unique identifier corresponding to the unique identification system of the requested Merchant affiliate system; and
  a code segment for generating a URL for the requested Merchant affiliate system, wherein the URL includes the correlated target Webmaster Merchant unique identifier, whereby the URL can be utilized to access the requested Merchant affiliate system, and further provide identification of the source Webmaster for requisite tracking.

16. A computer program as recited in claim 15, further comprising a code segment for obtaining transaction information from the target Merchant affiliate system for specified transactions.

17. A computer program as recited in claim 15, wherein the transaction information includes a target Webmaster unique identifier, a transaction amount and a transaction date.

18. A computer program as recited in claim 16, wherein transaction information is obtained by granting an affiliate pooling system access to a target Merchant affiliate system and allowing the affiliate pooling system to retrieve stored transaction information from said Merchant affiliate system.

19. A computer program as recited in claim 16, wherein the transaction information is obtained by granting the target Merchant affiliate system access to an affiliate pooling system and allowing said Merchant affiliate system to transfer the transaction information to the affiliate pooling system.

20. A computer program as recited in claim 15, wherein the received user request further includes an identifier for the target Merchant affiliate system, and an identifier for a source affiliate pool of the referring Webmaster.

21. A computer program as recited in claim 20, wherein the operation of correlating the source Webmaster unique identifier to the target Webmaster unique identifier comprises the operation of performing a lookup function utilizing the identifier for the source affiliate pool of the referring Webmaster and the source Webmaster unique identifier for the referring Webmaster.

22. A computer program as recited in claim 21, wherein the lookup function provides the target Webmaster unique identifier from a block of designated codes within the requested target Merchant affiliate system.

23. A computer program as recited in claim 15, wherein at least one of the plurality of Webmasters operates a web site having a banner ad for a related Merchant affiliate system.

24. A computer program as recited in claim 23, wherein the banner ad utilizes a link that includes an identifier for the target Merchant affiliate system whose banner is being displayed and a source Webmaster unique identifier for at least one of the plurality of Webmasters operating the web site.

25. A computer program as recited in claim 24, wherein the link further includes a URL for a Virtual Affiliate pooling system.

26. A computer program as recited in claim 15, wherein the code segment for configuring a Merchant affiliate system to receive referrals from a first plurality of Webmasters, further includes:
  code segment for selecting at least one transfer mode by which transaction information is transferred from the target Merchant affiliate system to the affiliate pooling system.

27. A computer program as recited in claim 26, wherein at least one transfer mode is selected from the group consisting of electronic mail, file transfer protocol, script call and manual entry.

28. A system for providing Virtual Affiliates to an existing affiliate system, the system comprising:
  logic for configuring an existing affiliate system to receive referrals from a referring Webmaster in an affiliate pool of Webmasters, including:
    logic for assigning a source Webmaster unique identifier for each of a first plurality of Webmasters each operating at least one web site;
  logic for receiving a user request for a target Merchant affiliate system URL from a web site operated by a particular referring Webmaster of the first plurality of Webmasters, wherein the user request includes the source Webmaster unique identifier for the particular referring Webmaster, and wherein the target Merchant affiliate system includes a unique identification system for its own affiliated Webmasters;
  logic for correlating the received unique identifier to a Merchant unique identifier corresponding to the unique identification system of the requested Merchant affiliate system; and
  logic for generating a URL for the requested Merchant affiliate system, wherein the URL includes the correlated Merchant unique identifier, whereby the URL can be utilized to access the requested Merchant affiliate system, and further provide identification of the source Webmaster for requisite tracking.

29. A system as recited in claim 28, further comprising logic for obtaining transaction information from the target Merchant affiliate system for specified transactions.

30. A system as recited in claim 29, wherein the transaction information includes a target Webmaster unique identifier a transaction amount and a transaction date.

31. A system as recited in claim 29, wherein the transaction information is obtained by granting an affiliate pooling system access to a target Merchant affiliate system and allowing the affiliate pooling system to retrieve stored transaction information from said Merchant affiliate system.

32. A system as recited in claim 29, wherein the transaction information is obtained by granting the target Merchant affiliate system access to an affiliate pooling system and allowing said Merchant affiliate system to transfer the transaction information to the affiliate pooling system.

33. A system as recited in claim 28, wherein the received user request further includes an identifier for the target Merchant affiliate system, and an identifier for a source affiliate pool of the referring Webmaster.

34. A system as recited in claim 28, wherein the logic for correlating the source Webmaster unique identifier to the target Webmaster unique identifier comprises logic for performing a lookup function utilizing the identifier for the source affiliate pool of the referring Webmaster and the source Webmaster unique identifier for the referring Webmaster.

35. A system as recited in claim 34, wherein the lookup function provides the target Webmaster unique identifier from a block of designated codes within the requested target Merchant affiliate system.

36. A system as recited in claim 28, wherein at least one of the plurality of Webmasters operates a web site having a banner ad for a related Merchant affiliate system.

37. A system as recited in claim 36, wherein the banner ad includes a link that includes an identifier for the target Merchant affiliate system whose banner is being displayed and a source Webmaster unique identifier for at least one of the plurality of Webmasters operating the web site.

38. A system as recited in claim 37, wherein the link further includes a URL for a Virtual Affiliate pooling system.

39. A system as recited in claim 28, wherein the logic for configuring a Merchant affiliate system to receive referrals from a first plurality of Webmasters, further includes:

logic for selecting at least one transfer mode by which transaction information is transferred from the target Merchant affiliate system to the affiliate pooling system.

40. A system as recited in claim 28, wherein at least one transfer mode is selected from the group consisting of electronic mail, file transfer protocol, script call and manual entry.

* * * * *

UNITED STATES PATENT AND TRADEMARK OFFICE
CERTIFICATE OF CORRECTION

| | |
|---|---|
| PATENT NO. | : 6,804,660 B2 |
| APPLICATION NO. | : 09/846159 |
| DATED | : October 12, 2004 |
| INVENTOR(S) | : Michael Landau et al. |

It is certified that error appears in the above-identified patent and that said Letters Patent is hereby corrected as shown below:

In column 24 of the issued patent, claim 28 should be amended as follows:

28. (Currently Amended) A system for providing Virtual Affiliates to an existing affiliate system, the system comprising:

a. <u>means</u> [logic] for configuring an existing affiliate system to receive referrals from a referring Webmaster in an affiliate pool of Webmasters, including means [logic] for assigning a source Webmaster unique identifier for each of a first plurality of Webmasters each operating at least one web site;

b. <u>means</u> [logic] for receiving a user request for a target Merchant affiliate system URL from a web site operated by a particular referring Webmaster of the first plurality of Webmasters, wherein the user request includes the source Webmaster unique identifier for the particular referring Webmaster, and wherein the target Merchant affiliate system includes a unique identification system for its own affiliated Webmasters;

c. <u>means</u> [logic] for correlating the received unique identifier to a Merchant unique identifier corresponding to the unique identification system of the requested Merchant affiliate system; and

(cont'd onto next page)

Signed and Sealed this
Seventeenth Day of April, 2012

David J. Kappos
*Director of the United States Patent and Trademark Office*

CERTIFICATE OF CORRECTION (continued)
U.S. Pat. No. 6,804,660 B2

(Cont'd)

d. <u>means</u> [logic] for generating a URL for the requested Merchant affiliate system, wherein the URL includes the correlated Merchant unique identifier, whereby the URL can be utilized to access the requested Merchant affiliate system, and further provide identification of the source Web master for requisite tracking.

UNITED STATES PATENT AND TRADEMARK OFFICE
CERTIFICATE OF CORRECTION

| | | |
|---|---|---|
| PATENT NO. | : 6,804,660 B2 | Page 1 of 2 |
| APPLICATION NO. | : 09/846159 | |
| DATED | : October 12, 2004 | |
| INVENTOR(S) | : Michael Landau et al. | |

It is certified that error appears in the above-identified patent and that said Letters Patent is hereby corrected as shown below:

In column 24, lines 19-45, of the issued patent, claim 28 should read as follows:

28. (Currently Amended) A system for providing Virtual Affiliates to an existing affiliate system, the system comprising:

a. <u>means</u> for configuring an existing affiliate system to receive referrals from a referring Webmaster in an affiliate pool of Webmasters, including means [logic] for assigning a source Webmaster unique identifier for each of a first plurality of Webmasters each operating at least one web site;

b. <u>means</u> for receiving a user request for a target Merchant affiliate system URL from a web site operated by a particular referring Webmaster of the first plurality of Webmasters, wherein the user request includes the source Webmaster unique identifier for the particular referring Webmaster, and wherein the target Merchant affiliate system includes a unique identification system for its own affiliated Webmasters;

c. <u>means</u> for correlating the received unique identifier to a Merchant unique identifier corresponding to the unique identification system of the requested Merchant affiliate system; and This certificate supersedes the Certificate of Correction issued April 17, 2012.

Signed and Sealed this
Fifteenth Day of May, 2012

David J. Kappos
*Director of the United States Patent and Trademark Office*

CERTIFICATE OF CORRECTION (continued)
U.S. Pat. No. 6,804,660 B2

(Cont'd)

d. <u>means</u> for generating a URL for the requested Merchant affiliate system, wherein the URL includes the correlated Merchant unique identifier, whereby the URL can be utilized to access the requested Merchant affiliate system, and further provide identification of the source Web master for requisite tracking.

UNITED STATES PATENT AND TRADEMARK OFFICE
CERTIFICATE OF CORRECTION

| | | |
|---|---|---|
| PATENT NO. | : 6,804,660 B2 | Page 1 of 1 |
| APPLICATION NO. | : 09/846159 | |
| DATED | : October 12, 2004 | |
| INVENTOR(S) | : Michael Landau et al. | |

It is certified that error appears in the above-identified patent and that said Letters Patent is hereby corrected as shown below:

In column 24 of the Issued Patent, claim 29 should be amended as follows:

29. (Currently Amended) A system as recited in claim 28, further comprising <u>means</u> [logic] for obtaining transaction information from the target Merchant affiliate system for specified transactions.

In column 24 of the Issued Patent, claim 34 should be amended as follows:

34. (Currently Amended) A system as recited in claim 28, wherein the <u>means</u> [logic] for correlating the source Webmaster unique identifier to the target Webmaster unique identifier comprises <u>means</u> [logic] for performing a lookup function utilizing the identifier for the source affiliate pool of the referring Webmaster and the source Webmaster unique identifier for the referring Webmaster.

In column 26 of the Issued Patent, claim 39 should be amended as follows:

39. (Currently Amended) A system as recited in claim 28, wherein the <u>means</u> [logic] for configuring a Merchant affiliate system to receive referrals from a first plurality of Webmasters, further includes:
<u>means</u> [logic] for selecting at least one transfer mode by which transaction information is transferred from the target Merchant affiliate system to the affiliate pooling system.

Signed and Sealed this
Eighth Day of January, 2013

David J. Kappos
*Director of the United States Patent and Trademark Office*